United States Patent Office 3,258,498
Patented June 28, 1966

3,258,498
PREPARATION OF NITROALKYLADAMANTANES
Abraham Schneider, Overbrook Hills, Pa., assignor to Sun Oil Company, Philadelphia, Pa., a corporation of New Jersey
No Drawing. Filed July 14, 1964, Ser. No. 382,668
18 Claims. (Cl. 260—644)

This invention relates to the preparation of novel nitroalkyladamantanes from alkyladamantanes having one or more methyl or ethyl substituents attached to bridgehead carbon atoms of the adamantane nucleus and having at least one unsubstituted bridgehead carbon atom. Nitroalkyladamantanes prepared according to the invention include both mononitro derivatives and dinitro derivatives.

The carbon nucleus of adamantane (tricyclo-[3.3.1.1$^{3,7}$]decane)

contains ten carbon atoms arranged in a completely symmetrical, strainless manner such that four of the carbon atoms occupy bridgehead positions in the rings. The structure of adamantane is often depicted typographically as follows:

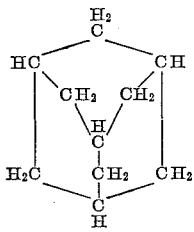

All four bridgehead carbons are equivalent to each other and likewise all rings are equivalent.

The present invention is directed to the conversion of certain alkyladamantanes into either mononitro or dinitro derivatives in which the alkyl groups and also the nitro groups are positioned at brideghead carbon atoms. More specifically the starting hydrocarbons for preparing the nitro compounds according to the present invention are the following: 1-methyladamantane; 1-ethyladamantane; 1,3 - dimethyladamantane; 1 - methyl-3-ethyladamantane; 1,3,5-trimethyladamantane; and 1,3-dimethyl-5-ethyladamantane. Unlike the bridgehead mononitro derivative of adamantane itself which derivative is a crystalline compound with a melting point of about 159° C., the mononitro derivatives of the foregoing alkyladamantanes are normally liquids. Hence they are useful as fuels for jet aircraft whereas 1-nitroadamantane does not have such utility. In general the dinitro derivatives prepared according to the present invention are crystalline compounds. They are useful as intermediates for preparing the corresponding diamino alkyladamantanes which have utility in the preparation of polymers that have adamantane nuclei in the polymer chain. The mononitro and also the dinitro alkyladamantanes prepared by the present invention are also useful as intermediates in the preparation of pharmaceuticals.

According to the invention an alkyladamantane as above specified is contacted with gaseous nitrogen dioxide at a temperature in the range of 150–220° C. and more preferably 170–200° C. This causes the substitution of an $NO_2$ group in place of a hydrogen atom at a bridgehead carbon, giving as the major product of the reaction 1-nitro-alkyladamantane. As contacting of the reaction mixture with nitrogeen dioxide proceeds, some dinitroalkyladamantane is also formed when the starting hydrocarbon has two or three unsubstituted bridgehead carbon atoms. In addition there are also formed minor amounts of the 1-hydroxy and the keto derivatives and also, in cases where the starting hydrocarbon has no more than two alkyl substituents, the 1-nitro-3-hydroxy derivative and the 1-nitro-keto derivative. In some instances non-bridgehead or secondary nitro compounds may be formed but only in small amounts. Contacting of the reaction mixture with $NO_2$ at 150–220° C. is continued until at least a major portion of the starting hydrocarbon has been converted and preferably until almost all of it has been consumed. Any non-bridgehead nitro compounds which may be present in the reaction product can be selectively removed by washing it with a concentrated aqueous or alcoholic solution of sodium or potassium hydroxide or with a concentrated aqueous solution of sodium or potassium carbonate. Thereafter the 1-nitro compound can be recovered as the major product of the reaction by appropriate fractional distillation. If desired the 1,3-dinitro derivative, which is the highest boiling reaction product, can also be recovered in lesser amount by distilling off the other derivatives.

The various derivatives produced in the reaction will boil according to the following order of increasing boiling points:

1-hydroxy compound
Keto compound
1-nitro compound
1-nitro-keto compound
1-nitro-3-hydroxy compound
1,3-dinitro compound Thus to separate the 1-nitro compound which is the major product, the 1-hydroxy and keto components are distilled off first and the 1-nitro compound is obtained as an intermediate product. The 1-hydroxy and keto derivatives together generally amount to only about 10% of the total conversion product. Thereafter the 1,3-dinitro derivative can be obtained by distilling off the 1-nitro-keto and 1-nitro-3-hydroxy compounds. The latter two also generally constitute only about 10% of the conversion product.

The nitration reaction can be carried out merely by bubbling nitrogen dioxide into the alkyladamantane hydrocarbon at the specified temperature and at atmospheric pressure. When this procedure is employed using a temperature, for example, of about 190° C., a reaction time typically of the order of 1–2 hours generally will be required to convert substantially all of the starting hydrocarbon to its derivatives. A preferable procedure is to contact the nitrogen dioxide under pressure with the hydrocarbon to facilitate dissolution of $NO_2$ in the hydrocarbon and expedite the reaction. For example, the reaction can be carried out at a pressure in the range of 50–500 p.s.i.g. in order to materially shorten the time required to effect the conversion. Venting of the gaseous products of reaction, e.g., water and NO, is necessary during the course of the reaction.

In a further embodiment of the invention in which the objective is to maximize the yield of 1,3-dinitroalkyladamantane, the reaction is carried out in two stages. First the starting hydrocarbon, which is one that has no more than two alkyl substituents, is contacted with nitrogen dioxide as above specified to produce the 1-nitro derivatives as the major product. The reaction mixture is then distilled to obtain a concentrate of the 1-nitroalkyladamantane. This concentrate can be the total distillate boiling up to the 1-nitro-keto compound or it can be a heart cut of the 1-nitro compound containing little if any of the lower or higher boiling derivatives. The concentrate of the 1-nitro derivative is then contacted with nitrogen dioxide at a temperature in the range of 190–220° C. to effect substitution of a second nitro group at another bridgehead position of the adamantane nucleus. It has been found that by conducting the reaction in two stages in this manner the formation of the other types of derivatives can be minimized and the conversion to the dinitro derivative can be maximized.

The bridgehead dinitro derivatives made from the starting hydrocarbons that have two alkyl groups, i.e., from 1,3-dimethyladamantane and from 1-methyl-3-ethyladamantane offer the advantage of being compounds which contain no tertiary hydrogen atoms since all bridgehead positions are substituted. The same is true of the mononitro trialkyladamantanes. This circumstance is advantageous in some instances for the reason that tertiary hydrogens tend to be reactive and hence the adsence of a tertiary hydrogen makes the compound more stable. This is advantageous, for example, where the dinitro derivatives are converted to their corresponding diamino compounds for use in making polymers. The absence of any unsubstituted bridgehead positions in the polymer renders it more stable to oxidation and the like.

The starting alkyladamantanes for practicing the present invention can be prepared by the isomerization of tricyclic napthenic hydrocarbons having the same number of carbon atoms as the desired alkyladamantane. Such isomerization using an aluminum halid catalyst is described in Schneider United States Patent No. 3,128,316, and isomerizations of tricyclic naphthenes using $HF-BF_3$ as catalyst for producing the alkyladamantanes having an ethyl substituent is described in Janoski et al. application Serial No. 359,401, filed April 13, 1964. By way of example 1,3-dimethyladamantane can be made in good yield from perhydroacenaphthene by contacting the latter with a liquid $AlCl_3$-HCl-hydrocarbon complex catalyst at 35° C. for eight hours; while 1,3,5-trimethyladamantane can be obtained by contacting perhydrofluorene with the same type of catalyst under similar conditions. Again using perhydroacenaphthene, a good yield of 1-ethyladamantane can be obtained by contacting this tricylclic naphthene with $HF-BF_3$ at 85° C. for six hours. As a further example a good yield of 1,3-dimethyl-5-ethyladamantane can be obtained by contacting perhydrophenanthrene with $HF-BF_3$ at 100° C. for eight hours.

The novel nitroalkyladamantane products of the present invention have particular utility as fuels or fuel components for jet aircraft and rockets. The mononitro derivatives, being normally liquid products, can be used alone as fuel or can be used in admixture with hydrocarbon fuels, such as naphtha, kerosene or light gas oil, in which they have good solubility. The dinitroalkyladamantanes are normally crystalline solids and can be employed in admixture with suitable oxidants, such as ammonium nitrate or potassium perchlorate, as solid fuels for rockets, or they can also be utilized in solution in liquid hydrocarbon fuels. The nitroalkyladamantanes are advantageous as fuels or fuel components since the oxygen which is bonded to the nitrogen is available for recombination during the combustion.

Nitroalkyladamantanes of the present invention can be reduced to the corresponding amino compounds which have utility in the preparation of pharmaceuticals, such as the hydrochloride salts of the monoamine and diamino alkyladamantanes. The diamino compounds are particularly useful for making polymers in which repeating alkyladamantane units appear in the chain. In such cases when the diamino compound contains two methyl groups or a methyl and ethyl group, the resulting polymer has no bridgehead hydrogen atoms and tends to be more stable than otherwise would be the case.

The following examples illustrate the invention more specifically:

Example I 1,3-dimethyladamantane in amount of 5.66 g. was heated to 175° C. and 5.96 g. of nitrogen dioxide were bubbled therethrough at atmospheric pressure over a period of 22 minutes. Water was formed during the reaction. The reaction mixture was then cooled and dissolved in ether, and the solution was washed with aqueous $K_2CO_3$ and then dried over $Na_2SO_4$. After evaporation of the ether, the liquid residue was analyzed by vapor phase chromatography in conjunction with infrared spectra. Composition of the reaction product in weight percent was as follows:

| | Percent |
|---|---|
| 1,3-dimethyladamantane | 72.2 |
| 1-hydroxy-3,5-dimethyladamantane | 4.6 |
| Keto-1,3-dimethyladamantane | 0.5 |
| 1-nitro-3,5-dimethyladamantane | 22.8 |

These results show that at the relatively low temperature and short contact time here employed at atmospheric pressure, only about 28% of the starting hydrocarbon was converted and no difunctional derivatives were produced. However, the conditions resulted in good selectivity with respect to formation of the 1-nitro compound, as the 1-nitro-3,5-dimethyladamantane constituted about 82% by weight of the three derivatives produced. This product can be obtained from the reaction mixture in high purity by distilling the unreacted hydrocarbon and the hydroxy and keto compounds therefrom. It is a liquid having a freezing point of the order of 0° C. and it has a boiling point of 114–115° C. at 2 mm. Hg absolute.

By way of contrast, when concentrated nitric acid (70% $HNO_3$ was used as the nitration agent by refluxing it at 110–112° C. for 4.75 hours with 1,3-dimethyladamantane, the major reaction product was the 1-hydroxy compound and only about 12% of the derivatives obtained was 1-nitro-3,5-dimethyladamantane.

Example II

Nitrogen dioxide at atmospheric pressure was bubbled through 1,3-dimethyladamantane at 194–202° C. over a period of 75 minutes using a total of 8.8 moles of $NO_2$ per mole of hydrocarbon. The product was dissolved in ether and washed with concentrated aqueous KOH. This removed a small amount of secondary nitro compound as evidenced by a blood-red color in the aqueous phase. Analysis of the product by vapor phase chromatography in conjunction with infrared spectroscopy gave the following results:

| | Percent |
|---|---|
| 1,3-dimethyladamantane | 1.3 |
| 1-hydroxy-3,5-dimethyladamantane | 7.7 |
| Keto-1,3-dimethyladamantane | 3.4 |
| 1-nitro-3,5-dimethyladamantane | 65.3 |
| 1-nitro-keto-3,5-dimethyladamantane | 1.9 |
| 1-nitrohydroxy-3,5-dimethyladamantane | 9.4 |
| 1,3-dinitro-5,7-dimethyladamantane | 11.0 |

These results show that approximately two-thirds of the product was the 1-nitroderiviative. Under the conditions here employed, practically all of the starting hydrocarbon was consumed and a little over 20% of the conversion product constituted difunctional derivatives including the dinitro compound.

Example III

The product from Example II was distilled at a pressure of 2 mm. Hg absolute to leave the difunctional compounds as residue and to obtain a distillate concentrate of the mononitro compound containing 84% thereof. The mononitrodimethyladamantane distilled over about 114–115° C. under the reduced pressure employed. Nitrogen dioxide was bubbled through the concentrate at a temperature of 201–205° C. for 33 minutes during which time a total of four moles of $NO_2$ per mole of mononitro compound was used. The product was worked up and analyzed as in the preceding example. Compositions of the distillate concentrate and its reaction product in weight percent were as follows:

|  | Concentrate, percent | Product, percent |
|---|---|---|
| 1,3-dimethyladamantane | 1.7 | |
| 1-hydroxy compound | 9.9 | 1.6 |
| Keto compound | 4.4 | 3.0 |
| 1-nitro compound | 84.0 | 79.6 |
| 1-nitro-keto compound | | 1.6 |
| 1-nitrohydroxy compound | | 4.0 |
| 1,3-dinitro compound | | 10.2 |

In the product the ratio of the 1,3-dinitro derivative to the other difunctional conversion products is 1.82. This compares with a dinitro to other difunctional component ratio of 0.97 for the one-step process of Example II. This shows that preparing a mononitro concentrate and reacting it with $NO_2$ improves the selectivity for producing the 1,3-dinitro derivative. When the reaction product was cooled to room temperature, the 1,3-dinitro derivative was a separate crystalline phase and was obtained from the slurry mixture by filtration. Upon recrystallization of this derivative twice at 0° C. from ether solution, purified 1,3-dinitro-5,7-dimethyladamantane having a melting point of 159–162° C. was obtained.

When other alkyladamantanes as herein specified are substituted for 1,3-dimethyladamantane, analogous results are obtained except that for the trialkyl hydrocarbons essentially only monofunctional derivatives are produced.

I claim:

1. Method of preparing a nitroalkyladamantane which comprises contacting an alkyladamantane selected from the group consisting of 1-methyladamantane, 1-ethyladamantane, 1,3-dimethyladamantane, 1-methyl-3-ethyladamantane, 1,3,5-trimethyladamantane and 1,3-dimethyl-5-ethyladamantane at a temperature in the range of 150–220° C. with nitrogen dioxide whereby substitution of an $NO_2$ group on a bridgehead carbon atoms of the adamantane nucleus occurs, and separating the resulting nitroalkyladamantane from the reaction mixture.

2. Method according to claim 1 wherein the temperature is in the range of 170–200° C.

3. Method which comprises contacting 1-methyladamantane with nitrogen dioxide at a temperature in the range of 150–220° C. and separating 1-nitro-3-methyladamantane from the reaction mixture.

4. Method which comprises contacting 1-ethyladamantane with nitrogen dioxide at a temperature in the range of 150–220° C. and separating 1-nitro-3-ethyladamantane from the reaction mixture.

5. Method which comprises contacting 1,3-dimethyladamantane with nitrogen dioxide at a temperature in the range of 150–220° C. and separating 1-nitro-3,5-dimethyladamantane from the reaction mixture.

6. Method which comprises contacting 1-methyl-3-ethyladamantane with nitrogen dioxide at a temperature in the range af 150–220° C. and separating 1-nitro-3-methyl-5-ethyladamantane from the reaction mixture.

7. Method which comprises contacting 1,3,5-trimethyladamantane with nitrogen dioxide at a temperature in the range of 150–220° C. and separating 1-nitro-3,5,7-trimethyladamantane from the reaction mixture.

8. Method which comprises contacting 1,3-dimethyl-5-ethyladamantane with nitrogen dioxide at a temperature in the range of 150–220° C. and separating 1-nitro-3,5-dimethyl-7-ethyladamantane from the reaction mixture.

9. Method of preparing 1,3-dinitro-5-methyladamantane which comprises contacting 1-methyladamantane with nitrogen dioxide at 150–220° C., separating a 1-nitro-3-methyladamantane concentrate from the reaction mixture, contacting said concentrate with nitrogen dioxide at 190–220° C., and separating 1,3-dinitro-5-methyladamantane from the reaction mixture.

10. Method of preparing 1,3-dinitro-5-ethyladamantane which comprises contacting 1-ethyladamantane with nitrogen dioxide at 150–220° C., separating a 1-nitro-3-ethyladamantane concentrate from the reaction mixture, contacting said concentrate with nitrogen dioxide at 190–220° C., and separating 1,3-dinitro-5-ethyladamantane from the reaction mixture.

11. Method of preparing 1,3-dinitro-5,7-dimethyladamantane which comprises contacting 1,3-dimethyladamantane with nitrogen dioxide at 150–220° C., separating a 1-nitro-3,5-dimethyladamantane concentrate from the reaction mixture, contacting said concentrate with nitrogen dioxide at 190–220° C., and separating 1,3-dinitro-3,5-dimethyladamantane from the reaction mixture.

12. Method of preparing 1,3-dinitro-5-methyl-7-ethyladamantane which comprises contacting 1-methyl-3-ethyladamantane with nitrogen dioxide at 150–220° C., separating a 1-nitro-3-methyl-5-ethyladamantane concentrate from the reaction mixture, contacting said concentrate with nitrogen dioxide at 190–220° C., and separating 1,3-dinitro-5-methyl-7-ethyladamantane from the reaction mixture.

13. Method of preparing a 1,3-dinitroalkyladamantane which comprises contacting an alkyladamantane selected from the group consisting of 1-methyladamantane, 1-ethyladamantane, 1,3-dimethyladamantane, and 1-methyl-3-ethyladamantane at a temperature in the range of 150–220° C. with nitrogen dioxide whereby substitution of an $NO_2$ group on a bridgehead carbon atom of the adamantane nucleus occurs to yield a 1-nitroalkyladamantane, separating a concentrate of said 1-nitroalkyladamantane from the reaction mixture, contacting said concentrate with nitrogen dioxide at a temperature in the range of 190–220° C. whereby substitution of a second $NO_2$ group on a bridgehead carbon atom occurs, and separating the resulting 1,3-dinitroalkyladamantane from the reaction mixture.

14. Method according to claim 13 wherein the first-mentioned temperature is in the range of 170–200° C.

15. Mononitroalkyladamantane selected from the group consisting of 1-nitro-3-methyladamantane, 1-nitro-3-ethyladamantane, 1-nitro-3,5-dimethyladamantane, 1-nitro-3-methyl-5-ethyladamantane, 1-nitro-3,5,7-trimethyladamantane and 1-nitro-3,5-dimethyl-7-ethyladamantane.

16. 1-nitro-3,5-dimethyladamantane.

17. Dinitroalkyladamantane selected from the group consisting of 1,3-dinitro-5-methyladamantane, 1,3-dinitro-5-ethyladamantane, 1,3-dinitro-5,7-dimethyladamantane and 1,3-dinitro-5-methyl-7-ethyladamantane.

18. 1,3-dinitro-5,7-dimethyladamantane.

No references cited.

LEON D. ROSDOL, *Primary Examiner.*

CARL D. QUARFORTH, *Examiner.*

L. A. SEBASTIAN, *Assistant Examiner.*